United States Patent [19]

Badsey

[11] Patent Number: 4,787,470

[45] Date of Patent: Nov. 29, 1988

[54] THREE WHEEL VEHICLE

[75] Inventor: William J. Badsey, San Juan Capistrano, Calif.

[73] Assignee: Yamaha Hatsudoki Kabushiki Kaisha, Iwata, Japan

[21] Appl. No.: 880,554

[22] Filed: Jun. 30, 1986

[51] Int. Cl.⁴ ............................................. B62D 61/06
[52] U.S. Cl. ..................................... 180/210; 280/269
[58] Field of Search ............... 180/210, 215; 280/269, 280/282

[56] References Cited

U.S. PATENT DOCUMENTS

| | | | |
|---|---|---|---|
| 3,419,098 | 12/1968 | Mayers et al. | 180/210 |
| 3,513,925 | 5/1970 | Figura | 180/210 |
| 3,746,118 | 7/1973 | Altorfer | 180/210 |
| 4,360,224 | 11/1982 | Sato et al. | 280/269 |
| 4,448,278 | 5/1984 | Badsey | 180/210 |

Primary Examiner—John J. Love
Assistant Examiner—Ross Weaver
Attorney, Agent, or Firm—Ernest A. Beutler

[57] ABSTRACT

An improved powered off the road three wheel vehicle comprised of a pair of front wheels and a single rear wheel carried by a frame that supports the saddle type seat adapted to seat a single rider. The track of the front wheels is equal to the wheel base between the front and rear wheels and a wider tire is carried by the rear wheel. The rear wheel has a footprint with the surface that is equal to the sum of the footprints of the front wheels. The rider is positioned midway between the front and rear wheels and is seated in such a way that he may shift his weight to aid in the maneuverability of the vehicle. In addition, the rear wheel, even though it is wide, is sized so that it will pass between the legs of a rider if he desires to permit the vehicle to ride out from beneath him.

7 Claims, 2 Drawing Sheets

THREE WHEEL VEHICLE

BACKGROUND OF THE INVENTION

This invention relates to a three wheel vehicle and more particularly to an improved three wheel, single rider vehicle.

Recently, there have been proposed for recreational and other purposes a wide variety of vehicles adapted to be riden by a single rider. In addition to two wheel vehicles, such single rider vehicles include three and four wheel vehicles. The type of three wheel vehicles heretofore proposed for this purpose have consisted of a single steered front wheel and a pair of driven rear wheels. In order to adapt the vehicle to utilization over a wide variety of terrains, it was the practice to mount large low pressure tires on all of the wheels. In addition to improving traction, such tires may, in some instances, obviate the necessity for a suspension system. However, many of the three wheel vehicles of the type described have also incorporated suspension systems.

Although the type of three wheel vehicle having a single front wheel and a pair of driven rear wheels has wide versatility, it is believed that the handling, maneuverability and utility of such vehicles could be further improved. Enjoyment of the rider can be increased significantly if the maneuverability of the vehicle under widely varying terrains and over a wide variety of surfaces such as sand, marsh land or hard territory could be improved.

It is, therefore, a principal object of this invention to provide an improved three wheel vehicle.

It is a further object of this invention to provide a three wheel vehicle that offers advantages in improved handling and rideability.

It is a further object of this invention to provide an improved three wheel vehicle that will increase rider comfort and enjoyment.

SUMMARY OF THE INVENTION

This invention is adapted to be embodied in a single rider, three wheel vehicle having a frame, a pair of front wheels dirigibly supported by the frame at the forward end thereof, a single rear wheel supported at the rear end of the frame, power means carried by the frame for driving the rear wheel and a single saddle type seat carried by the frame.

Another feature of this invention is adapted to be embodied in a three wheel vehicle having a frame, a pair of front wheels dirigibly supported by the frame at its forward end and a single rear wheel supported at the rear end of the frame. Power means are carried by the frame for driving the rear wheel. In accordance with this feature of the invention, the track between the front wheels equals the wheel base of the vehicle between the front and rear wheels.

DETAILED DESCRIPTION OF THE PREFERRED EMBODIMENT

Figure 1:
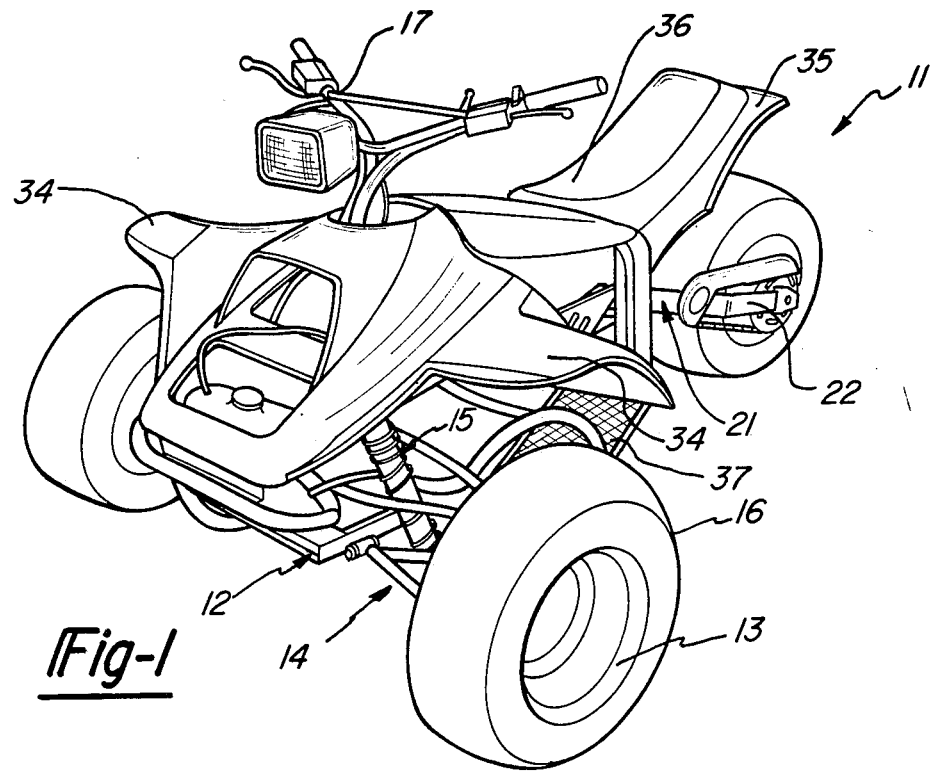
FIG. 1 is a perspective view taken from above and the front showing a three wheel vehicle constructed in accordance with an embodiment of the invention.
Figure 2:
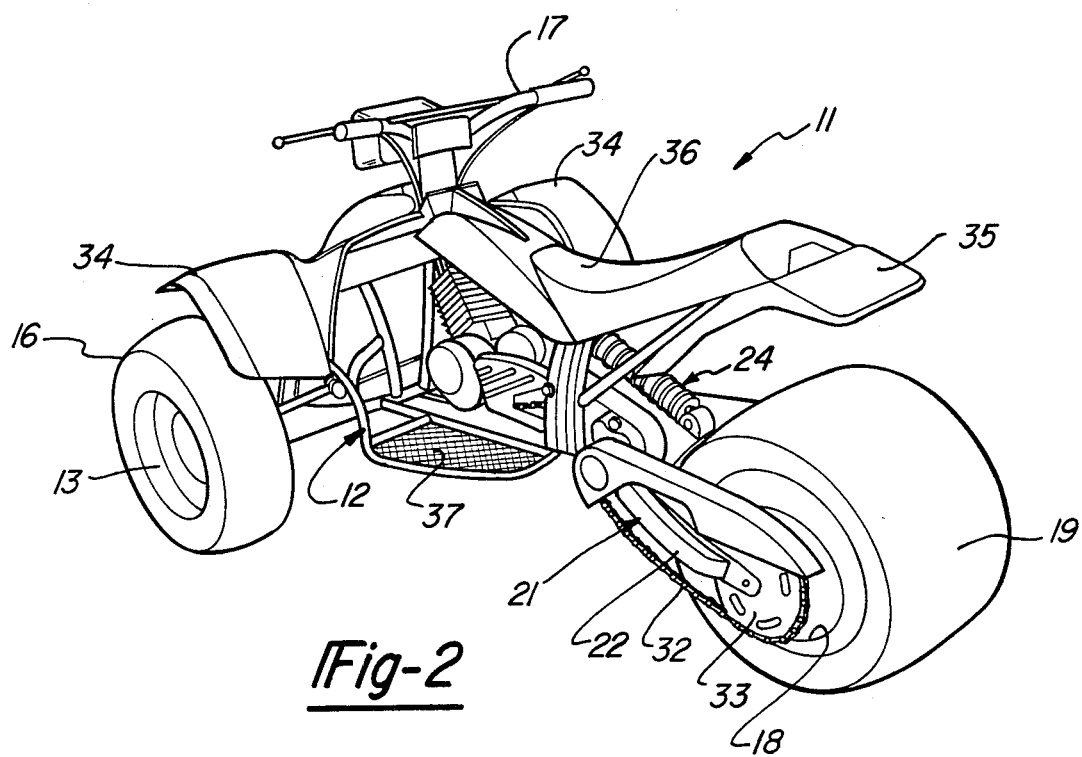
FIG. 2 is a perspective view of the vehicle looking from the rear and above.

A three wheel vehicle constructed in accordance with an embodiment of the invention is identified generally by the reference numeral 11. The vehicle 11 includes a frame assembly, which is indicated generally by the reference numeral 12, and which may have any specific configuration. However, in a preferred form, the frame 12 is of the welded up, generally open type.

Figure 4:
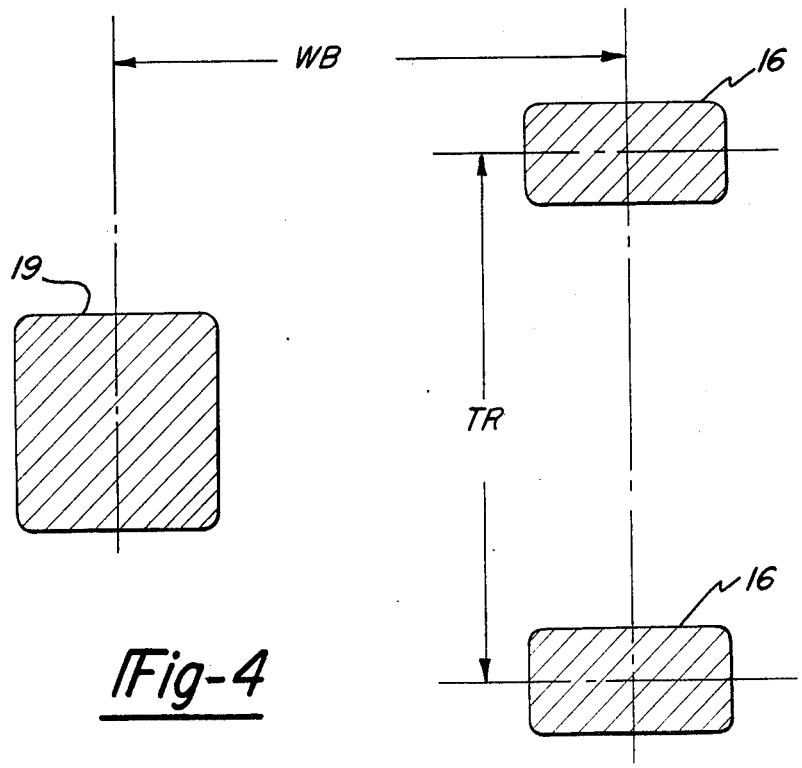
FIG. 4 is a top plan view showing the contact patches between the front and rear tires and the ground.

A pair of front wheels 13 are supported at the front end of the frame 12 by means of a front suspension system, indicated generally by the reference numeral 14, which may be comprised of the parallel A arm type with the inboard pivot points for the arms being located substantially close to the longitudinal center line of the frame 12 and vehicle 11. Tubular type shock absorbers and surrounding coil compression spring assembies 15 are loaded between the lower arm of the front suspension 14 and the frame 12 in any suitable manner. The front wheels 13 mount large low pressure balloon tires 16. The term "low pressure balloon tires" is intended to encompass those types of tires that are normally inflated to a pressure in the range 0.1 to 0.2 kg/cm$^2$ and which have a relatively large contact patch with the ground. In FIG. 4, the contact patches of the front tires with the ground are indicated by the areas 16.

The front wheels 13 and tires 14 are also supported by the suspension system 14 for steering movement about respective steering axes. The steering of the front wheels 13 and tires 16 is accomplished by means of a handlebar mechanism 17 that is mounted on the frame assembly 12 for steering movement and which is coupled to the front wheels 13 in a suitable manner.

The vehicle 11 also includes a rear wheel 18 that mounts a large low pressure balloon tire 19. It will be seen from the figures that the rear wheel 18 and specifically its mounted tire 19 has a substantially greater width than the width of the front wheels 13 and their mounted tires 16. The reasons for this will be as described, however, it should be noted from FIG. 4 that the contact patch of the rear tire 19 with the ground, indicated by the shaded area 19, is substantially greater than that of either of the front wheels 16. However, it has been discovered by the stability and handling may be improved by providing the contact patch 19 of such an area that it equals the sum of the contact patches 16. That is, the contact area between the tires on the front wheels and the ground equals the contact area between the rear wheel tire and the ground. As has been noted, this has been found to give superior handling.

The rear wheel 18 and mounted tire 19 are supported for suspension movement relative to the frame 12 by means including a trailing arm assembly, indicated generally by the reference numeral 21. The trailing arm assembly 21 has a pair of arm portions 22 that extend on the opposite sides of the rear wheel 18 and its mounted tire 19. The arm 21 has a generally Y configuration in top plan and, therefore, the arms 22 are joined to a single forwardly extending arm portion that is pivotally supported on the frame assembly 12 for pivotal movement about a pivot axis 23. The suspension movement about this pivot axis is damped and controlled by means of a combined tubular shock absorber and surrounding coil spring assembly 24 that is loaded between the trailing arm 21 and the frame 12 in a suitable manner. It should be noted that the spring shock absorber assembly 24 extends in a substantially horizontal plane so as to provide large suspension movements while maintaining a low overall configuration.

A power plant, indicated generally by the reference numeral 25, is supported within the frame 12 for driving the rear wheel 18 and tire 19 in a manner to be described. The power plant 25 may be of the motorcycle type that includes an internal combustion engine having a combined crankcase and change speed transmission assembly, indicated generally by the reference numeral 26. Although the engine portion may have any suitable configuration, it is particularly advantageous if the engine of the power unit 25 has its cylinder block disposed at a substantial angle to the vertical and closely positioned to the horizontal. This provides a low center of gravity which is useful in insuring a good handling for the vehicle and good stability.

An output shaft 27 of the crankcase transmission assembly 26 drives a first chain 28 that is disposed substantially close to the longitudinal center line of the frame 12. Alternatively, a shaft drive may be employed. The chain 28 or shaft drive, if it is employed, is utilized to drive one end of an intermediate shaft 29 that is rotatably journaled on the trailing arm 21 in a suitable manner. Since a chain drive is employed in the illustrated embodiment, a sprocket 31 is affixed to one end of the intermediate shaft 29 and is driven by the chain 28. A corresponding sprocket (not shown) is affixed to the outer end of the intermediate shaft 29 and drives a second chain 32 which chain is positioned a substantial distance outward from the longitudinal center line of the vehicle and outwardly of the outer periphery of the wheel 18 and tire 19. The chain 32 drives a sprocket 33 that is affixed for rotation with the rear wheel 18 so as to drive it.

A fuel tank 30 is carried by the frame 12 at a low position and forwardly of the power unit 25. A rearward location may also be used but it should be low in the frame 12 to maintain a low center of gravity for good handling.

A body of a suitable configuration and comprised of a pair of front fenders 34 and a rear fender 35 which overlie the front tires 16 and rear tires 19, respectively, is carried on the frame 12 in an appropriate manner. This body includes a single saddle type seat 36 that is positioned to accommodate a single rider. A pair of foot rests 37 are carried on the frame 12 on opposite sides of its center line and on opposite sides of the power unit 25 for accommodating the feet of the rider on the seat 36.

Figure 3:
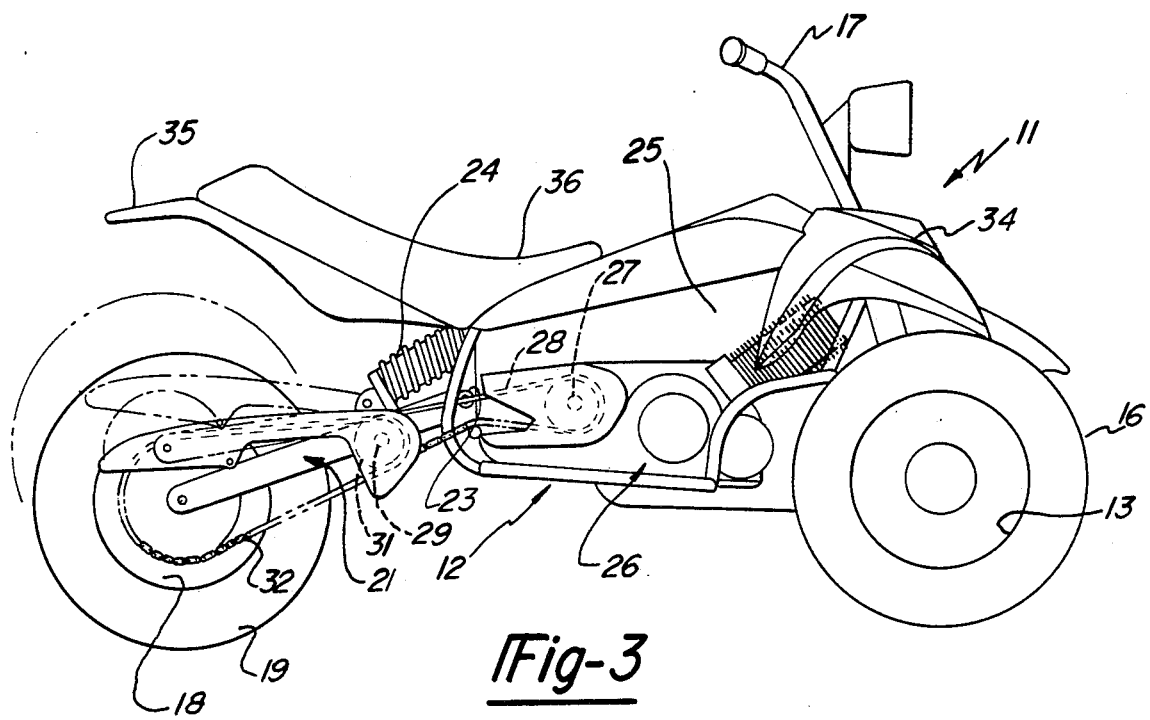
FIG. 3 is an enlarged, side elevational view of the vehicle.

The placement of the seat 36 and foot rests 37 is such that the rider may center his weight between the front and rear wheels 13 and 18 and specifically between the contact patches of their respective tires 16 and 19. In a preferred construction, this placement is such that the rider's weight will normally be positioned midway between the rotational axes of the front and rear wheels or midway along the wheel base, indicated by the dimension WB in FIG. 3. Also, the configuration is such that the rider may conveniently shift his weight forward or rearwardly to assist in maneuvering the vehicle 11.

It should also be noted that even though the rear wheel and tire 19 are quite wide, the width is not such that a rider may not place his feet on the ground and permit the vehicle 11 to ride out under him under emergency conditions with the rear wheel and tire 19 passing between the rider's legs. This offers considerable advantages over the type of three wheel vehicles embodying two rear wheels wherein this is not possible.

Also, it should be noted that because a single rear wheel is employed, there will not be the effect of rear wheel steering as would result if there were a pair of driven rear wheels with no differential when traveling over rough terrain when one rear wheel might leave contact with the ground. Also, the relative contact patches between the front and rear wheels and the rider placement on the frame 12 is such that it is unlikely that the front wheels 13 and specifically their tires 16 will leave contact with the ground when sudden applications of power are made by the rider. Also, the width of the rear tire 19 should not be too great so as to make steering or turning difficult and the aforedescribed relationship is particularly useful in such an arrangement. It has also been found that the handling may be improved if the wheel base WB (FIG. 3) is equal to the track TR of the front wheels 16. If these dimensions are equal, there is a very good balance between the front and rear end and even though there are only three wheels, the vehicle is extremely stable and offers very good maneuverability.

It should be readily apparent that the foregoing description is only that of a preferred embodiment of the invention and that various changes and modifications may be made without departing from the spirit and scope of the invention, as defined by the appended claims.

I claim:

1. A single rider three wheel vehicle having a frame a pair of front wheels dirigibly supported by said frame at the forward end thereof, a single rear wheel supported at the rear end of said frame, suspension means for suspending each of said wheels for independent movement to said frame about respective pivot area fixed relative to said frame, power means carried by said frame for driving said rear wheel, and a single saddle type seat carried by said frame midway between said front and rear wheels on a longitudinal centerplane passing through said frame, said front and rear wheels carrying tires, the effective area of contact of the rear wheel mounted tire with the ground being equal to the sum of the contact areas of the front wheel carried tires with the ground, the wheel base between said front and rear wheels equally the tread between said front wheels.

2. A single rider three wheel vehicle as set forth in claim 1 wherein the front wheel suspension includes at least one A arm for each wheel pivotally supported at its inner end about an axis fixed in proximity to the longitudinal center line of the frame.

3. A single rider three wheel vehicle as set forth in claim 1 wherein the rear wheel suspension includes a trailing arm pivotally supported at its forward end on the frame.

4. A single rider three wheel vehicle as set forth in claim 3 wherein the front wheel suspension includes at least one A arm for each wheel pivotally supported at its inner end about an axis fixed in proximity to the longitudinal center line of the frame.

5. A single rider three wheel vehicle as set forth in claim 1 wherein the power means comprises a reciprocating engine having its cylinders inclined to the vertical toward the horizontal.

6. A single rider three wheel vehicle as set forth in claim 5 further inculding handlebar means for steering the front wheels and carried by the frame.

7. A single rider three wheel vehicle as set forth in claim 1 further including foot support means carried by the frame in proximity to the seat, the rear wheel having a width that is sized so as to pass between the legs of a rider if the rider stands on the ground to permit the vehicle to ride out from underneath him.

* * * * *